INVENTOR
THOMAS J. PUZNIAK

INVENTOR
THOMAS J. PUZNIAK

INVENTOR
THOMAS J. PUZNIAK

INVENTOR
THOMAS J. PUZNIAK

United States Patent Office 3,496,760
Patented Feb. 24, 1970

3,496,760
METHOD AND APPARATUS FOR DETERMINING THE POUR POINT OF LIQUIDS
Thomas J. Puzniak, Cheswick, Pa., assignor to Gulf Research & Development Company, Pittsburgh, Pa., a corporation of Delaware
Filed Apr. 4, 1967, Ser. No. 628,384
Int. Cl. G01n 25/02
U.S. Cl. 73—17
14 Claims

ABSTRACT OF THE DISCLOSURE

A method and apparatus for automatically determining the pour point of liquids by freezing a small slug of the liquid in a vertical position, allowing the frozen slug to thaw until it falls into a void below the freezing chamber, and determining the pour point temperature by means of an interlocking thermocouple and relay arrangement.

Figure 1:
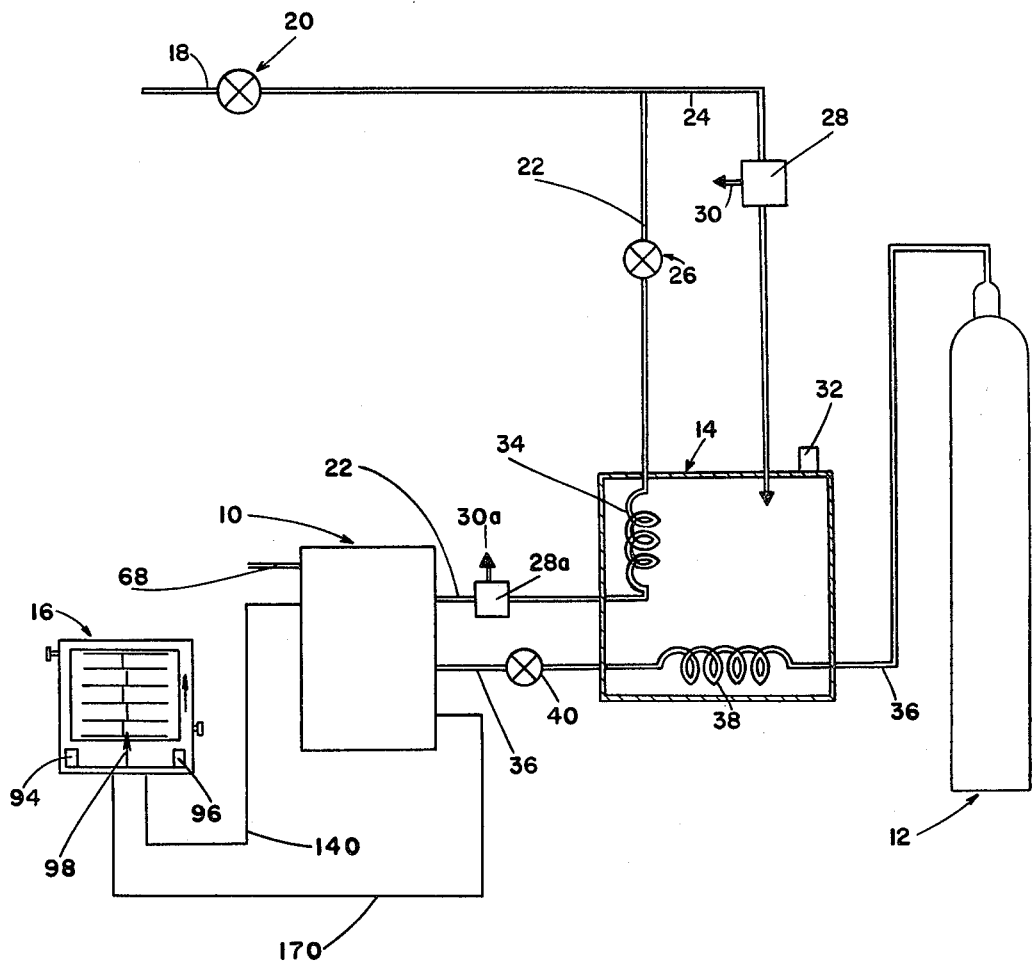

This invention relates to the art of physical analysis of materials, and more particularly pertains to a method and apparatus for automatically determining the pour point of a wide range of liquids, particularly hydrocarbon liquids.

"Pour point" is a more or less empirical physical characteristic of liquids, and is most commonly defined as the lowest temperature at which the liquid will just pour or flow, under its own weight, under certain specified conditions. One of the most generally used procedures is known as ASTM-D-97, and generally comprises placing a small quantity of the liquid into a standard vessel and lowering the temperature. At every five degree interval of temperature, the vessel is tilted and visually examined to see if the oil will pour. Quite obviously, this test is time consuming, has a maximum accuracy on the order of plus or minus five degrees, and depends upon the skill of the human operator, all of which are serious disadvantages.

It is known that the melting point of a liquid bears a linear relationship to the liquid's pour point. That is, if the melting point is known, the pour point is that temperature plus or minus a known number of degrees. The correction factor to change melting temperature to pour point temperature is known for various classes of liquids. For example, for lubricating oils the relationship is pour point temperature equals melting point temperature plus 3° F. For other petroleum products there is a similar relationship. Therefore, pour point temperature and melting or freezing point temperature are used synonymously herein.

It is the object of the invention to provide a method and apparatus to automatically determine the pour point of liquids, and particularly hydrocarbon liquids, accurately, quickly, and without any human judgment factor.

Various methods are known in the art to automatically determine the pour point of liquids. A large number of these methods fall into two general types or classes. The first type determines the freezing point of the sample as the sample is cooled to its freezing point. The second type determines the freezing point as the sample is warmed from a frozen condition through the freezing point and back to a liquid.

The first type is more difficult to handle and less accurate than the second in that it is difficult to accurately detect the point at which the sample congeals or solidifies. Some devices of this type utilize vibrating detectors adapted to detect the formation of crystals as an indication of freezing point.

The present invention is of the second type wherein the freezing point is detected as a frozen sample is warmed to and through its freezing point temperature. Some prior devices of this second type depend upon the creation of a light reflecting surface upon solidification of the sample. A light and photocell arrangement are positioned so that the beam of light will bounce off of the surface when it is created by the freezing of the sample and picked up by the photocell to indicate freezing point. These light reflecting types of apparatuses suffer from several disadvantages which are overcome by the present invention. One disadvantage is that the color of the sample has a bearing on results. That is, samples that are very dark or black may not trigger the apparatus at all or may give widely differing results from sample to sample of the same liquid. Another disadvantage is that the sample handling equipment must be rather small to quickly create a good reflecting surface. The relatively small sample handling equipment prevents the use of the apparatus with the more viscous hydrocarbon liquids such as lubricating oils. These more viscous liquids can not be handled because they would not flow out of the apparatus, or would not flow fast enough, or would clog the relatively small sample handling equipment.

The apparatus of the present invention is not effected by the color of the sample at all, can handle a wide range of kinds of liquids, and can handle liquids having viscosities ranging from about 1.5 to about 1500 centipoises at 100° F.

Other apparatuses of this second type utilize a pressure force, either mechanical or hydraulic, behind the frozen slug to urge it to move. In the present invention, the entire system in the test cell is at atmospheric pressure and the slug is large enough, and it is disposed vertically, so that it will move under its own weight, thereby avoiding the introduction of additional forces such as hydraulic force or head, or a mechanical force such as a spring. These extra forces give a false reading of melting point, and also are another variable factor which detracts from the reliability of the device.

Figure 2:
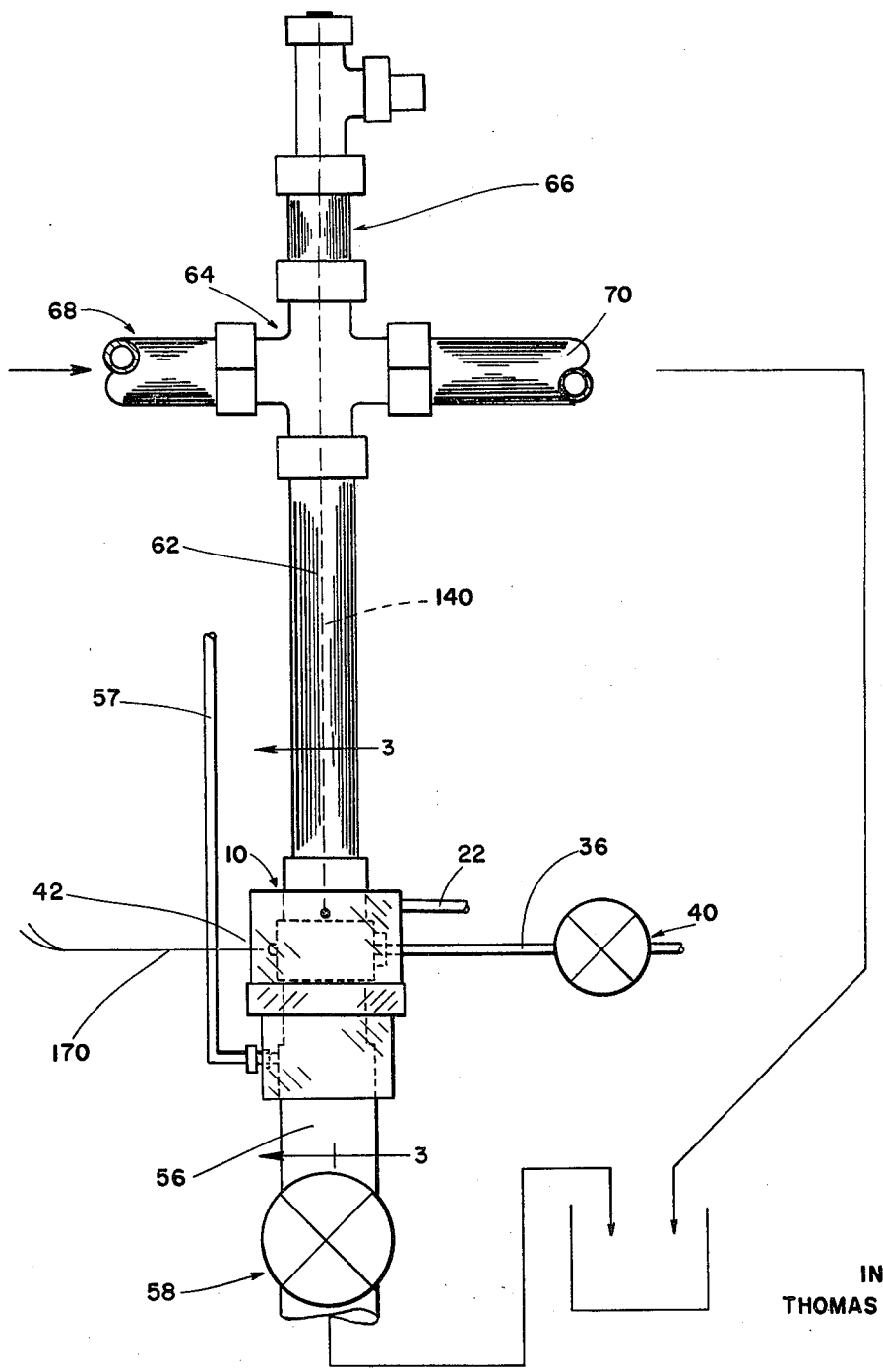
Figure 3:
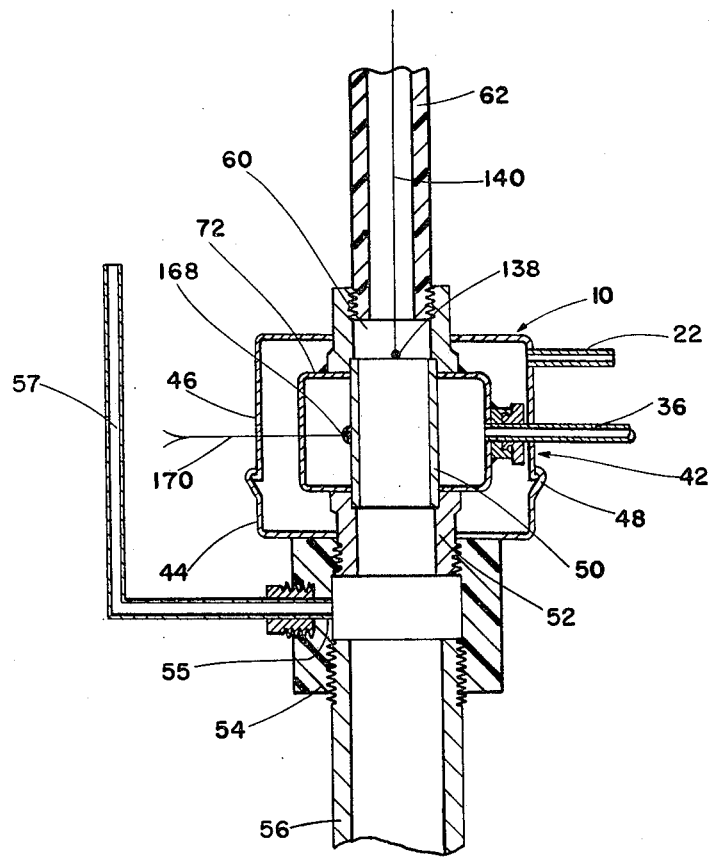
Figure 5:
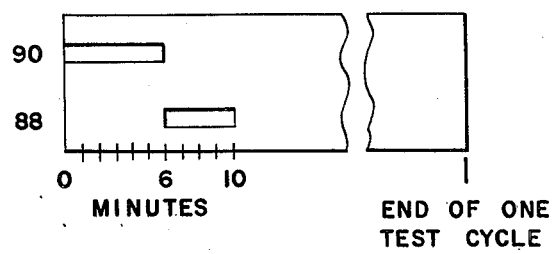
Figure 4:
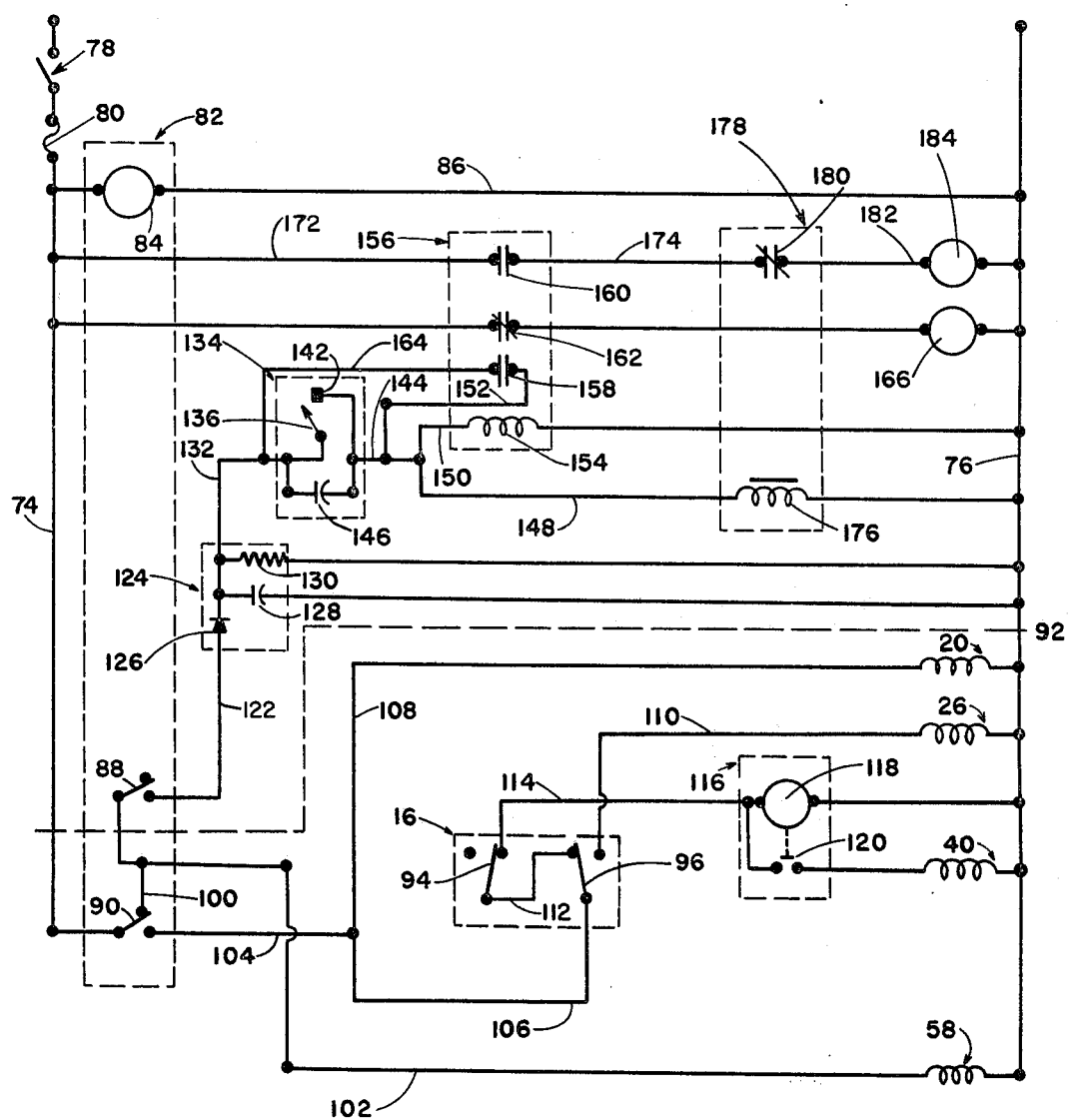

In the accompanying drawing forming a part of this disclosure: FIG. 1 is a block diagram of the overall system; FIG. 2 is an elevational view of the analyzer cell; FIG. 3 is a cross-sectional view taken on line 3—3 of FIG. 2; FIG. 4 is an electrical schematic diagram of the apparatus of the invention; and FIG. 5 is a bar chart illustrating the time relationship of the freezing and thawing cycles.

Referring now to the overall block diagram and schematic of FIG. 1, the invention comprises an analyzer section 10, a source of refrigerant 12, which is preferably the readily available liquid $CO_2$ cylinders, a precooler box 14, and a recording means 16, preferably a chart type recorder. In addition to the tank of refrigerant 12, the apparatus of the invention is also supplied with electricity for control purposes, partially described below and partially not shown, and is connected to a source of the usual 100 p.s.i.g. institutional service air supply through a pipe or conduit 18.

The flow of service air in pipe 18 is controlled by a solenoid valve 20. Downstream from solenoid valve 20, pipe 18 is divided into two pipes 22 and 24 that go to precooler box 14. The flow of service air in pipe 22 is controlled by a solenoid valve 26. The flow of air in pipe 24 passes through a vortex cooling device 28, and then passes into the space within precooler box 14. Vortex cooler 28 is a standard device which exhausts part of the air passing therethrough through an exhaust 30, and cools the remainder of the air by as much as 100° F. The vortex cooler operates on the principle of a turbine energy exchange. The cooler comprises a miniature turbine which vortexes the air passing therethrough. The hotter, lighter, high velocity air migrates to the outside of the vortex, while the very cold, heavier, low velocity air migrates to the center of the vortex. The hot air is exhausted and the cold air is passed on. One vortex cooler found to be suitable for use in the apparatus of the invention is known as a "Ranque-Hilsch" vortex tube, model number VT–163 A 25L with generator.

The cooled air from the pipe 24 fills precooler box 14 and bleeds to atmosphere through a bleeder valve 32. Pipe 22 is provided with a coil 34 positioned within precooler box 14. After passing out of precooler box 14, pipe 22 is provided with a vortex cooler 28a identical to vortex cooler 28. After vortex cooler 28a, pipe 22 passes into analyzer section 10 and delivers cold air to be used in the method of the invention as will be described below. A pipe 36 connects the refrigerant tank 12 to the analyzer section 10. A suitable $CO_2$ drier, not shown, may be provided in line 36 in the conventional manner. Pipe 36 is provided with a coil 38 positioned within the precooler box 14. The flow of refrigerant into the analyzer is controlled by a refrigerant pulsing solenoid 40.

Thus, by the use of the service air in pipe 18 and the precooler box 14, the liquid $CO_2$ is precooled before use in the analyzer, and a supply of cold air through pipe 22 is provided for use in the analyzer. The above described apparatus is intended to maximize the efficiency of use of the refrigerant. This is desirable not from just the viewpoint of conserving the $CO_2$ in the pressurized cylinders, which are relatively inexpensive, but rather from the viewpoint of maximizing the number of tests that can be run on each tank. The efficiency is gained by reducing the labor required to change tanks and the amount of time the apparatus is not in use because the refrigerant is exhausted. When the precooling feature comprising the box 14 and the service air through pipes 18, 22, and 24 is used, about 500 tests can be run on one standard tank of $CO_2$. Without this refrigerant economy apparatus, only about 60 tests can be run on one standard tank of $CO_2$. Thus, the economy apparatus cuts wasted time to less than one-eighth of what it would be without the economy apparatus, plus an equivalent saving in the cost of $CO_2$.

Referring now to FIG. 2, there is shown an external view of the analyzer section 10. The analyzer cell is contained within a cold air jacket 42 which is connected to pipe 22 to surround the freeze chamber with cold air. Referring to FIG. 3, jacket 42 may comprise a simple metal can having a lid 44, a body 46, and attaching means 48 therebetween. The jacket 42 is loosely mounted around the freeze chamber to permit exhaust of the cold air coming in through pipe 22.

Referring to FIG. 3, the analyzer cell is built around a freeze chamber 50 comprising a cylindrical length of tubing, preferably made of stainless steel, or other material having strong resistance to corrosion from the various fluids handled by the apparatus and good heat transmission properties. Chamber 50 has an inside diameter substantially equal to ⅜ of an inch and a length of about ¾ of an inch. This is a relatively large diameter for a pour point analyzer freeze chamber, and the ability of the method and apparatus of the invention to work with such a large freeze chamber is instrumental in providing the advantage of operability with the heavier or more viscous liquids, including lubricating oils.

Means are provided to thermally isolate chamber 50 from all other parts of the apparatus. To this end, a lower adapter fitting 52 is connected to the outside surface of the lower end of freeze chamber 50 by any suitable means, and joins the lower end of the freeze chamber to a heat insulating adapter 54. Adapter 54 is preferably fabricated of a heat insulating material such as Teflon. The lower end of fitting 54 is connected to a drain pipe 56, the flow through which is controlled by a drain solenoid valve 58. Drain pipe 56 empties into an open vessel, and the sample material may be discarded or returned to the process at the convenience of the operator. Adapter 54 is formed with a side radial vent opening 55 to which a vent pipe 57 is attached by any suitable means. The inside diameter of fitting 52 is slightly larger than the inside diameter of freeze chamber 50 and the inside of adapter 54 is larger than the inside of fitting 52. Thus, any material falling out of freeze chamber 50 will be completely unobstructed. Air jacket 42 is supported on the upper surface of adapter 54 by contact with the underside of lid 44.

An upper adapter fitting 60 similar to adapter fitting 52 connects the upper end of freeze chamber 50 with a heat insulating supply pipe 62. Supply pipe 62 is preferably formed of a heat insulating material such as Teflon, and has a predetermined length so that the column of liquid therein will exert a negligible pressure on the slug which will be frozen in freeze chamber 50, as will appear more clearly below.

The upper end of supply pipe 62 is connected to the bottom vertical leg of a cross fitting 64. The opposite leg of cross fitting 64 is connected to a vent 66. A third leg of cross 64 is connected to a sample supply pipe 68, and the remaining leg of cross 64 is connected to a sample bypass pipe 70. Sample bypass pipe 70 may empty into the same collection vessel that drain pipe 56 drains into, or alternatively, pipes 56 and 70 could return to the process directly by piping with a suitable vent.

Freeze chamber 50, between the fittings 52 and 60, is surrounded by a refrigerant chamber 72. Chamber 72 is connected to the $CO_2$ supply pipe 36. Chamber 72 is highly porous so that the $CO_2$ entering therein through pipe 36 will exhaust into the space within jacket 42 and outside the chamber 72. Refrigerant chamber 72 is tightly sealed to the outside of the freeze chamber 50 and is preferably formed of 10–15 micron pore size sintered brass.

Referring now to the electrical diagram of FIG. 4, a pair of main supply lines 74 and 76 are provided. A master on-off switch 78 and a suitable fuse 80 are provided in supply line 74. Housed within a control box, not shown, is a master timer 82. The control box also houses the various other electrical control components described below. Timer 82 comprises a continuously operating motor 84 connected across supply lines 74 and 76 by a line 86. Mounted on the shaft of motor 84 is a pair of cams, not shown, which respectively operate two switches 88 and 90. One timer found suitable for use in the invention is manufactured by the Industrial Timer Company, model number MC8/60 min. As is well known to those skilled in the art, by suitable selection of the positions of the lobes on the cams and by adjusting the speed of the motor 84, switches 88 and 90 can be made to open and close any number of times and for any length of time per selected unit of time.

To aid in the explanation of the operation below, an artificial line 92 has been drawn across the schematic of FIG. 4. The portion of the apparatus below line 92 is utilized primarily in the freeze cycle and is controlled by master timer switch 90, and the portion of the apparatus above line 92 is utilized primarily in the thawing cycle and is controlled by switch 88.

The chart recorder 16 is of a standard type. One recorder found suitable for use in the invention is known as a 7-inch Dynamaster recorder, model IP 12G760G01 having a range from minus 100° F. to plus 50° F. Referring to FIG. 1, the chart recorder is provided with adjustable low and high end limit switches 94 and 96. The recording pen or needle 98 on recorder 16 will activate switch 94 when the needle is moved to temperatures below the temperature corresponding to the position at which switch 94 is physically set. Similarly, the needle will activate high end switch 96 when it moves above the present high temperature.

Freeze cycle control switch 90, when it is not activated, supplies current from supply line 74 to a line 100 which supplies current to the common junction of thaw cycle control switch 88, and also to a line 102 which controls drain solenoid 58. In the activated position, freeze cycle control switch 90 will supply line current to a line 104 which supplies current to a pair of lines 106 and 108. Line 108 feeds current to the main service air solenoid valve 20. Line 106 supplies current to the common junction of the high end recorder limit switch 96. A line 110 connects the high portion terminal switch 96 to cold air supply solenoid 26. The deactivated portion terminal of switch 96 is connected to the common terminal of low end limit switch 94 by a jumper 112. The contact at the normal position of limit switch 94 is connected by a line 114 to a pulsing control device 116, which controls $CO_2$ pulsing solenoid 40.

Device 116 comprises a motor 118 which drives a cam or the like to control a switch 120 to cause the solenoid 40 to pulse at some predetermined rate which may be set on the device 116. A suitable component to be used as device 116 is manufactured by the Industrial Timer Company, model number CM–2.

When activated, thaw cycle control switch 88 feeds current to a line 122 which feeds current into a D.C. supply circuit 124, which comprises a diode 126, a capacitor 128 and a resistor 130, in the usual arrangement. Current from a supply circuit 124 is fed through a line 132 to a latching type meter 134. One type of meter suitable for use in the invention is sold under the trademark "SIM-PLY-TROL," and is manufactured by Assembly Products, Inc., model 0–250° F.

The needle 136 on meter 134 is driven by a thermocouple 138, see FIG. 3, positioned closely adjacent the upper surface of the slug frozen within freeze chamber 50. The thermocouple leads 140 pass through insulating pipe 62 and are supported by vent assembly 66 (see FIG. 2) at the upper leg of cross connection 64. By so supporting the wires, the thermocouple junction 138 may be accurately located closely adjacent the upper surface of the frozen slug. Meter 134 is provided with a moveable contact 142 adapted to be contacted by needle 136 to complete a circuit to a line 144. An arc suppressing capacitor 146 is provided in parallel across contact 142.

Line 144 feeds current to three lines 148, 150, and 152.

Line 150 feeds current to the coil 154 of a relay 156 having two pairs of normally open contacts 158 and 160 and one pair of normally closed contacts 162.

Line 152 is connected to one side of normally open contacts 158, and a line 164 connects the other side of said contacts to line 132. One side of normally closed contacts 162 is connected directly to supply line 74, and the other side of said contacts is connected to a motor 166, which drives the recording pen 98 on chart recorder 16 to indicate the temperature of the frozen slug within freeze chamber 50. The control signals to drive pen 98 are detected by a thermocouple 168 which is joined to the outside of freeze chamber 50 within chamber 72 to detect the temperature of the frozen slug. A pair of thermocouple leads 170 connect thermocouple 168 to pen motor 166 within chart recorder 16.

Normally open contacts 160 control the connection between line 172 connected to supply line 74 and a second line 174.

Line 148 is connected to the coil 176 on a time delay relay 178 having a pair of normally closed contacts 180. Time delay relay 178 is of the conventional type and will take current through its coil for a predetermined finite length of time before it operates its contacts. One side of contacts 180 is connected to line 174, and the other side of said contacts is connected by a line 182 to a motor 184 on chart recorder 16. Motor 184 will operate to move the chart in recorder 16 as long as the circuit is completed through contacts 160 and 180.

OPERATION

As shown in FIG. 5, at the beginning of a test cycle, the master timer will first close switch 90 to initiate the freeze cycle, and then after some predetermined length of time will simultaneously open switch 90 and close switch 88 to start the thaw cycle. As shown in FIG. 5, freezing takes about six minutes and thawing takes about four minutes, but it will be understood that these times may vary from one liquid to another, and the total time may be slightly more or less than the ten minutes in the example. The chart of FIG. 5 is shown broken to illustrate the fact that one testing cycle can be made per any unit length of time greater than the overall cycle time by appropriate adjustments of the cams and motor speed in master timer 82. For example, in some applications a pour point reading may be required once every hour, in others, once every 24 hours.

It will be assumed that the liquid being tested is known to have a pour point around minus 2° F. Accordingly, the switches 94 and 96 on the chart recorder 16 will be set to bracket minus 2° F., for example, plus and minus 40° F. The width of the bracket determined by the setting of the two switches 94 and 96 has an effect on the economy of use of refrigerant, as will appear below. If the switches are set too far from the estimated pour point temperature, refrigerant will be supplied for too long a period of time and an excessive amount of refrigerant will be consumed. If the switches are set too close to the estimated pour point temperature, the refrigerant will be supplied for too short a period of time, and the sample may not be frozen at all.

The adjustable contact 142 on meter 134 is set near to but higher than minus 2° F. Contact 142 must be set at a temperature greater than the pour point temperature of the sample, but much latitude is possible as to how much greater, as will appear more clearly below. In the example being described, satisfactory results have been obtained when contacts 142 have been set at a temperature as high as plus 100° F., and in general, this contact may be set as far away as 125° F. on the high side of the anticipated pour point temperature.

Pen motor 166 will be recording whatever the temperature happens to be within freeze chamber 50, and will generate the horizontal lines shown in FIG. 1 on the recorder chart as the temperature is lowered. The vertical lines connecting the horizontal lines indicate the pour points of successive samples. The chart motor is operated through a circuit completed through normally closed contacts 162 on relay 156.

Upon closing of switch 90, the circuit is broken through lines 100 and 102 to the coil of drain solenoid valve 58, and this valve returns to its normally closed position. Closing of valve 58 backs up a column of liquid from the valve through the freeze chamber 50, pipe 62, and into cross 64. Before the initiation of the freeze cycle, the flow of sample liquid through supply pipe 68 flows through pipe 62, through the freeze chamber, past drain valve 58, and into a collection vessel or back to the process, as explained above. After the drain valve closes, the flow of liquid through supply pipe 68 bypasses pipe 62 and flows through bypass pipe 70 into the collection vessel or back to the process. It is significant that the sample to be frozen is stationary before being frozen, which permits the use of a relatively large diameter freeze chamber. Switch 90 completes a circuit through lines 104 and 108 and opens solenoid valve 20 to permit the flow of service air through pipes 18 and 24 to cool the inside of precooler box 14. Valve 20 remains open during the entire freeze cycle.

The invention requires that the sample liquid in supply pipe 68 and cross 64 be hot. This is generally no problem when the apparatus is used in a refinery or other chemical process, since it almost always can be tapped into the process at some point where the liquid is in a heated condition. In the occasional situation where it is not hot, suitable heating means, such as steam tracing, are supplied. The temperature of the sample in the example being described is about 210° F.

The needle 98 on recorder 16 will be trying to register about 210° F. and will have activated switch 96. Activation of switch 96 (to the position opposite that shown in FIG. 4) completes a circuit to solenoid 26 via lines 104 and 106, switch 96 and line 110. Air is then supplied through valve 20, line 22, now open valve 26, coil 34 in precooler box 14, vortex cooler 28a, and into jacket 42. The temperature within the precooler box 14 will be about 0° F. due to the action of vortex cooler 28. The temperature of the air put into jacket 42 by vortex cooler 28a will be about −20° F. Air cooling continues until needle 98 moves below the temperature at which switch 96 is set, in this example, plus 40° F. When the temperature within the freeze chamber gets below plus 40° F., switch 96 moves back to the position shown in FIG. 4 and the circuit is broken to cold air solenoid valve 26, and a circuit is completed to the refrigerant pulsing device 116 through lines 104, 106, switch 96, jumper 112, switch 94 (inactivated at this time), line 114, and to device 116 which controls $CO_2$ pulsing solenoid 40. $CO_2$ is supplied from tank 12 through pipe 36, through coil 38 in the precooler box 14, through pulsing solenoid 40, through pipe 36 and into chamber 72 to freeze the sample within freeze chamber 50.

Cooling of the sample within freeze chamber 50 continues until the time for the freeze cycle expires as controlled by master timer 82. A sufficient length of time is provided to assure that the sample will be frozen, and may be adjusted for various different liquids, as is well known to those skilled in this art. The $CO_2$ will be cut off if too long a time is provided when needle 98 moves below the temperature at which switch 94 is set, −40° F. in this example.

As will be clear to one skilled in this art, the sample could be frozen by use of the cold air coming out of vortex cooler 28a alone without any refrigerant, but a longer freeze cycle time would be required. This is so because the cold air goes through no physical phase change, as does a refrigerant, and hence has a much smaller heat absorbing capacity than does a refrigerant. Thus, the refrigerant economy apparatus of the invention can be used to permit operation of the invention without refrigerant at all in those cases where the particular set of conditions permit it. The conditions would have to be that there is plenty of time for the freeze cycle, and the freeze temperature of the sample would have to be higher than minus 20° F.

At the end of the freeze cycle, switch 90 returns to the position shown in FIG. 4. This completes the circuit to main drain solenoid valve 58, which opens, and the liquid below the now frozen slug in freeze chamber 50 drains. Atmospheric conditions prevail both under the frozen slug via vent 57 and above the frozen slug and the column of liquid in pipe 62 via vent 66.

Thawing of the frozen slug begins immediately at the end of the freeze cycle. The heat for thawing is supplied by the temperature gradient in the liquid within pipe 62. It will be appreciated that the temperature of the liquid at cross 64 is about 210° F., and the temperature of the frozen slug is below the range of the anticipated pour point temperature. In the example being described, the temperature of the frozen slug will be on the order of minus 30° F. at the beginning of the thaw cycle.

Needle 136 on meter 134 slowly moves from the low temperature towards the pour point temperature and contact 142. Needle 136 moves in response to the temperature sensed by thermocouple 138, which detects a temperature substantially equal to but slightly higher than the temperature of the material within freeze chamber 50 at any time.

Thawing continues until the frozen slug reaches its melting point, at which time the slug rushes into the enlarged empty space below the slug. It can now be appreciated that the provision of an enlarged empty space below the frozen slug causes a tremendously rapid motion of the slug and the liquid above it downwardly under the influence of gravity. This rapid motion will be constant for any liquid since it is a gravity phenomenon, which has a very desirable effect on the accuracy of the method and apparatus of the invention.

Upon the falling of the frozen slug, the hot liquid in pipe 62 and cross 64 will rush past thermocouple 138 and will cause an almost instantaneous motion of needle 136 from the low temperatures slightly below the anticipated pour point it had been registering to high temperatures on the order of 210° F. Meter 134 is of a type which responds almost instantaneously. When needel 136 contacts contact 142 during the rapid upward sweep of the needle, a circuit is completed to coil 154 of relay 156 and coil 176 of relay 178, simultaneously. The circuit runs from supply line 74, switch 90, line 100, now closed switch 88, line 122, supply circuit 124, line 132, needel 136 and contact 142, line 144, and parallel lines 148 and 150 to the two coils. Operation of coil 154 operates the contacts on relay 156 immediately. The closing of contacts 158 establishes a holding circuit for relay 156 and shunts the current away from needel 136 and contact 142, which are relatively delicate components. The circuit is completed from lines 132 and 164, now closed contacts 158, line 152, and back to line 144. Opening of normally closed contacts 162 breaks the circuit to pen motor 166 thus stopping the pen at the melting point which is sensed by thermocouple 168. Closing of normally open contacts 160 makes a circuit through lines 172, 174, and 182 to chart motor 184 on the recorder 16.

Means are provided to operate the chart motor for a predetermined length of time to create the vertical lines between the horizontal lines shown in FIG. 1 on chart recorder 16. To this end, time delay relay 178 remains inactivated for a predetermined length of time determined by the time delay feature built into coil 176 thereof. In the example being described, this time delay is five seconds. At the end of the five seconds, coil 176 opens normally closed contacts 180 and breaks the circuit to the chart motor.

At the end of the thaw cycle, switch 88 returns to the position shown in FIG. 4, and the apparatus is thereby automatically reset for the next cycle.

The thermocouple 168 on the freeze chamber 50 senses melting point temperature. However, as explained above, only a linear correction is necessary to correct melting point temperature to pour point temperature, and this correction is easily automatically accommodated by a standard presetting correction on chart recorder 16.

While the invention has been described in detail above, it is to be understood that this detailed description is by way of example only, and the protection granted is to be limited only within the spirit of the invention and the scope of the following claims.

I claim:
1. A method of determining the pour point of a liquid comprising the steps of supplying a flow of the liquid in a heated condition to a vertically disposed freeze chamber, disposing said freeze chamber in a vertically disposed conduit, first blocking the flow of said liquid through said conduit and freeze chamber below said freeze chamber to selectively create a stationary column of said liquid through said conduit and through said freeze chamber, then freezing a slug of said liquid in said freeze chamber, releasing the liquid below said frozen slug, whereby said frozen slug thereafter supports the column of liquid in said conduit above said slug, thawing said slug, and detecting the temperature at which said slug and said column of liquid falls out of said freeze chamber.

2. The method of claim 1, wherein the temperature at which said slug and said column of liquid falls out of said freeze chamber is detected by the steps of continuously detecting the temperature of said freeze chamber, continuously detecting the temperature of said column of liquid at a point closely adjacent the top surface of said frozen slug, detecting a rapid rise in temperature at said point closely adjacent the upper surface of said frozen slug, and recording the temperature of said freeze chamber at the time said rapid change in temperature is detected at said point closely adjacent the top surface of said frozen slug.

3. The method of claim 1, wherein said slug is frozen in said freeze chamber by flowing a stream of cooled air into a first chamber surrounding said freeze chamber to lower the temperature of the liquid in said freeze chamber to a first predetermined range of temperature, stopping the flow of said cooled air after the temperature of said liquid arives at said first predetermined range of temperature, flowing a refrigerant into a second chamber surrounding said freeze chamber and nested within said first chamber to lower the temperature of the liquid in said freeze chamber to a second predetermined range of temperature, said second predetermined range of temperature being lower than said first predetermined range of temperature.

4. The method of claim 3, flowing a coolant into a precooler vessel to cool said vessel, flowing said stream of air through said precooler vessel before flowing said stream of air into said first chamber, and flowing said refrigerant through said precooler vessel to precool said refrigerant before flowing said refrigerant into said second chamber.

5. The method of claim 4, and further cooling said stream of air after said stream of air flows out of said precooler vessel and before said stream of air flows into said first chamber.

6. An apparatus for determining the pour point of a liquid comprising vertically disposed conduit means, freeze chamber means disposed in said conduit means, means to supply a heated flow of the liquid being tested to said conduit means, valve means at the lower end of said conduit means to control the flow of liquid therethrough, whereby a column of said liquid being tested may be backed up from said valve means through said conduit means and freeze chamber means upon closure of said valve means, said conduit means being formed with a cross-sectional area larger than the cross-sectional area of said freeze chamber means between said freeze chamber means and said valve means at the lower end thereof, means to freeze a slug of said liquid in said freeze chamber means, and means to sense the temperature of said liquid being tested in said freeze chamber means and means to record the temperature at which said frozen slug thaws sufficiently from the heat in the remainder of said liquid in said conduit means to fall downwardly out of said freeze chamber means.

7. The apparatus of claim 6, said freeze chamber means comprising a freeze chamber comprising a length of cylindrical tubing formed of thermally conductive material, and means to thermally isolate said freeze chamber from said conduit means.

8. The apparatus of claim 7, said thermally conductive material comprising stainless steel.

9. The apparatus of claim 7, said thermal isolating means at the upper end of said freeze chamber comprising a portion of said conduit means comprising a heat insulating tube joining said upper end of said freeze chamber to said means to supply said heated flow of liquid, and said thermal isolating means at the lower end of said freeze chamber comprising a portion of said conduit means formed by an adapter member formed of heat insulating material having an internal cross-sectional area larger than the internal cross-sectional area of said freeze chamber.

10. The apparatus of claim 9, said heat insulating material in said portions of said conduit means comprising Teflon.

11. The apparatus of claim 6, means in said enlarged portion of said conduit means connecting the space below said freeze chamber means to atmosphere, and means at the upper end of said conduit means connecting the space above said freeze chamber means to atmosphere, whereby a frozen slug in said freeze chamber means experiences a downward force due to its own weight and the weight of the column of liquid above said frozen slug.

12. The apparatus of claim 6, said freeze chamber means comprising a freeze chamber comprising a length of cylindircal tubing formed of thermally conductive material, said freezing means comprises inner and outer nested chambers surrounding said freeze chamber, means to selectively supply a flow of coolant to said outer chamber, and means to selectively supply a flow of refrigenrant to said inner chamber.

13. The apparatus of claim 12, and control means, said control means comprising means to flow cold air into said outer chamber to bring the temperature of the liquid in said freeze chamber down to a temperature close to but higher than the freezing temperature of said liquid, and said control means comprising means to then stop said flow of cold air and to flow a refrigerant into said inner chamber to freeze said liquid in said freeze chamber.

14. The apparatus of claim 6, said freeze chamber means comprising a freeze chamber comprising a length of cylindrical tubing formed of thermally conductive material, control means, said control means comprising a first thermocouple in contact with said freeze chamber wall to sense the temperature of the material within said freeze chamber, said control means comprising a second thermocouple positioned within said conduit means closely adjacent to and above the material within said freeze chamber, said control means comprising means adapted to record the temperature sensed by said first thermocouple when said second thermocouple senses a rapid change in temperature.

References Cited

UNITED STATES PATENTS

| 1,096,911 | 5/1914 | Hawxhurst | 73—17 |
| 3,122,912 | 3/1964 | O'Neill et al. | 73—17 |
| 3,173,288 | 3/1965 | Davis et al. | 73—17 |
| 3,173,289 | 3/1965 | Davis | 73—17 |

JAMES J. GILL, Primary Examiner

HERBERT GOLDSTEIN, Assistant Examiner